US006973781B2

(12) United States Patent
Brown et al.

(10) Patent No.: US 6,973,781 B2
(45) Date of Patent: Dec. 13, 2005

(54) METHOD AND APPARATUS FOR MAINTAINING HYDRAULIC PRESSURE WHEN A VEHICLE IS STOPPED

(75) Inventors: Todd Brown, Batavia, OH (US); Stefan Sommer, Cincinnati, OH (US); Hebert Mozer, Batavia, OH (US)

(73) Assignee: ZF Friedrichshafen AG, Friedrichshafen (DE)

( * ) Notice: Subject to any disclaimer, the term of this patent is extended or adjusted under 35 U.S.C. 154(b) by 49 days.

(21) Appl. No.: 10/695,884

(22) Filed: Oct. 29, 2003

(65) Prior Publication Data

US 2005/0096171 A1    May 5, 2005

(51) Int. Cl.[7] ............................................. F04B 49/00
(52) U.S. Cl. .......................... 60/413; 417/16; 417/223
(58) Field of Search .................... 60/413, 416; 417/16, 417/223, 374

(56) References Cited

U.S. PATENT DOCUMENTS

| 4,034,628 A |   | 7/1977  | Sakai et al. |        |
|-------------|---|---------|--------------|--------|
| 4,632,207 A |   | 12/1986 | Moore        |        |
| 5,355,676 A | * | 10/1994 | Inokuchi     | 60/413 |
| 6,350,108 B1 |  | 2/2002  | Haupt        |        |

FOREIGN PATENT DOCUMENTS

WO           95/12060         5/1995      ............ F01M 5/02

* cited by examiner

*Primary Examiner*—Edward K. Look
*Assistant Examiner*—Michael Leslie
(74) *Attorney, Agent, or Firm*—Davis & Bujold, P.L.L.C.

(57) ABSTRACT

A system for maintaining hydraulic pressure in a vehicle hydraulic system when the vehicle is stopped or idling. A hydraulic pressure reserve system includes a primary hydraulic circuit that includes a hydraulic pump and a hydraulic sump and that provides hydraulic pressure to at least a hydraulically actuated transmission and an accumulator tank and control valve connected from the primary hydraulic circuit for storing a reserve of hydraulic fluid at an accumulator pressure. An accumulator control valve, such as a bi-directional valve, allows a flow of hydraulic fluid between the primary circuit and the accumulator tank according to the primary circuit pressure to raise the primary circuit pressure towards a desired pressure. The hydraulic pressure reserve system may include a primary gear connected from a primary drive and driving an auxiliary secondary gear with a primary drive clutch for connecting the secondary gear to drive the hydraulic pump and an auxiliary drive clutch for connecting the auxiliary secondary gear or a drive chain to drive the hydraulic pump.

6 Claims, 4 Drawing Sheets

METHOD AND APPARATUS FOR MAINTAINING HYDRAULIC PRESSURE WHEN A VEHICLE IS STOPPED

CROSS REFERENCES TO RELATED APPLICATIONS

1. Field of the Invention

The present invention is related to a system and a method for maintaining hydraulic pressure in a vehicle hydraulic system when the vehicle is stopped or idling and, in particular, for maintaining hydraulic pressure for the vehicle transmission system when the vehicle is stopped or idling.

2. Background of the Invention

Hydraulically driven and controlled systems are commonly used in vehicle for a range of vehicle systems and functions. A common example of such is a vehicle transmission system, but the vehicle hydraulics systems may include a variety of other systems, such as the brake system or an adaptive suspension system. Also, certain vehicle systems may be integrated, at least with regard to a common, central system for providing hydraulic pressure to a number of hydraulically powered or controlled systems. For example, the hydraulic system for a transmission may also provide hydraulic power for the vehicle braking system, and so on.

A common problem in vehicle hydraulic systems, however, is in providing and maintaining the necessary levels of hydraulic pressure and hydraulic fluid flow over the full range of operating conditions, that is, when the vehicle is stopped or is otherwise idling as well as when the engine is operating at full power.

In particular, in many hydraulic systems of the prior art, hydraulic pressure and hydraulic fluid flow is provided by a primary hydraulic pump that is driven by the primary engine of the vehicle, which may be, for example, a gas or diesel engine or an electric motor or a hybrid system combining two or more sources of power, such as a gas/electric hybrid. As such, the size and capacity of the hydraulic pump is generally adapted to the average operating ranges of the vehicle and the pump, that is, to provide the necessary hydraulic pressure and fluid flow when the engine and vehicle are operating in the mid-ranges of the capabilities. As a consequence, however, it is very common that the hydraulic pump will not deliver adequate hydraulic pressure or fluid flow at the lower end of the engine operating range, such as when the vehicle is stopped and the engine is thereby idling, or when the engine is idling for any other reasons, such as when the vehicle is coasting or running downhill or at engine start-up. At the other extreme, when the engine is operating in its upper range the hydraulic pump may generate more pressure and fluid flow than is needed or than is safe when the engine is running at the top end of its range, thereby wasting power or putting excess wear or stress on the hydraulic pump and system, even if only for relatively short periods, or may itself be of inadequate capacity to provide the necessary pressure and fluid flow.

The hydraulic systems of the prior art have attempted to resolve these problems by providing a primary hydraulic pump driven by the vehicle's primary power source to provide the necessary hydraulic pressures and fluid flows in the normal and upper operating ranges of the engine and vehicle, and a secondary pump and power source to provide hydraulic pressure and fluid flow in the lower operating ranges of the vehicle and engine, in the idling ranges, and, for example, at engine start-up. The secondary power source may be any form of motor or engine and may be of the same type as the primary power source, but is typically of a different type from the primary power source, such as an electric motor when the primary source is a gas or diesel engine or a gas engine when the primary power source is an electric or hydraulic motor. While this method is generally operable, it does require an additional power source and the mechanisms and systems necessary to control the secondary power source and pump, with the resulting increase in cost, complexity and weight.

The present invention offers a solution to these and other related problems of the prior art.

SUMMARY OF THE INVENTION

The present invention is related to a system and a method for maintaining hydraulic pressure in a vehicle hydraulic system when the vehicle is stopped or idling and, in particular, for maintaining hydraulic pressure for the vehicle transmission system when the vehicle is stopped or idling.

A first embodiment of the present invention accordingly includes a hydraulic pressure reserve system for a vehicle hydraulic system wherein the vehicle hydraulic system includes a primary hydraulic circuit that includes a hydraulic pump and a hydraulic sump and that provides hydraulic pressure to at least a hydraulically actuated transmission.

The hydraulic pressure reserve system includes an accumulator tank connected from the primary hydraulic circuit for storing a reserve of hydraulic fluid at an accumulator pressure, an accumulator control valve for controlling a flow of hydraulic fluid between the primary hydraulic circuit and the accumulator tank, and an accumulator controller responsive to a primary hydraulic circuit pressure and to the accumulator pressure for controlling the accumulator control valve. The accumulator controller actuates the accumulator control valve to allow a flow of the hydraulic fluid from the primary hydraulic circuit and into the accumulator tank when the primary hydraulic circuit pressure is greater than the accumulator pressure and actuates the accumulator control valve to allow a flow of the hydraulic fluid from the accumulator tank to the primary hydraulic circuit when the primary hydraulic circuit pressure is lower than a desired minimum primary hydraulic circuit pressure, thereby raising the primary hydraulic circuit pressure towards a desired primary hydraulic circuit pressure.

In one embodiment, the accumulator control valve includes a bidirectional valve allowing a bidirectional flow of hydraulic fluid between the accumulator tank and the primary circuit and the accumulator controller includes a spring biased bidirectional valve controller actuating the bidirectional valve dependent upon a differential pressure across the valve controller between the primary circuit and the accumulator tank. When there is a positive differential pressure across the bidirectional valve controller, wherein the primary circuit hydraulic pressure is greater than the accumulator pressure be greater than a selected positive actuation pressure, the bidirectional valve is opened by the bidirectional valve controller to allow the hydraulic fluid to from into the accumulator tank and the accumulator pressure to rise accordingly. When there is a negative differential pressure across the bidirectional valve controller, wherein the primary circuit pressure is less than the accumulator pressure by greater than a selected negative actuation pressure, the bidirectional valve is opened by the bidirectional valve controller to allow the hydraulic fluid to flow from the accumulator tank to the primary circuit, thereby raising the primary hydraulic circuit pressure towards a desired primary hydraulic circuit pressure.

In typical implementations, the bidirectional valve controller includes positive and negative adjustable bias springs acting upon the bidirectional valve and it is typical that the magnitude of the positive actuation pressure is less than the magnitude of the negative actuation pressure and that the positive and negative actuation pressures are selected to provide hysteresis in opening and closing of the bidirectional valve.

The invention may also be implemented as separate valves and controllers, so that the accumulator reserve system includes a first accumulator control valve and a corresponding first accumulator controller connected from the primary circuit and to the accumulator tank for controlling the flow of hydraulic fluid from the primary hydraulic circuit and to accumulator tank and a second accumulator control valve and a corresponding second accumulator controller connected from the primary circuit and to the accumulator controller for in parallel with the first accumulator control valve and the first accumulator controller for controlling the flow of hydraulic fluid from the accumulator tank and to the primary hydraulic circuit.

In another embodiment of the present invention, the hydraulic pressure reserve system includes a primary gear set including a primary gear connected from a primary drive and driving a secondary gear, an auxiliary gear set including an auxiliary primary gear connected from an auxiliary drive and driving an auxiliary secondary gear, a primary drive clutch connected from the secondary gear for connecting the secondary gear to drive the hydraulic pump when the primary drive clutch is actuated, and an auxiliary drive clutch connected from the auxiliary secondary gear for connecting the auxiliary secondary gear to drive the hydraulic pump when the auxiliary drive clutch is actuated.

The hydraulic pressure reserve system may further include a hydraulic drive controller responsive to a hydraulic pressure of the hydraulic system to disengage the primary drive clutch and engage the auxiliary drive clutch when the hydraulic pressure of the hydraulic system is less than a selected minimum pressure and to engage the primary drive clutch and disengage the auxiliary drive clutch when the hydraulic pressure of the hydraulic system is greater than a selected operating pressure.

Either or both of the primary and secondary drive gears and the auxiliary primary and secondary drive gears may be are engaged through a drive chain.

In an alternate embodiment, the hydraulic pressure reserve system includes a primary gear connected from a primary drive by a primary drive clutch, an auxiliary primary gear connected from an auxiliary drive by an auxiliary drive clutch, and a secondary gear engaged with the primary gear and the auxiliary primary gear and connected to drive the pump. The primary drive will drive the hydraulic pump through the primary gear and the secondary gear when the primary drive clutch is actuated, and the auxiliary drive will drive the hydraulic pump through the auxiliary primary gear and the secondary gear when the auxiliary drive clutch is actuated.

The hydraulic pressure reserve system may further include a hydraulic drive controller responsive to a hydraulic pressure of the hydraulic system to disengage the primary drive clutch and engage the auxiliary drive clutch when the hydraulic pressure of the hydraulic system is less than a selected minimum pressure and to engage the primary drive clutch and disengage the auxiliary drive clutch when the hydraulic pressure of the hydraulic system is greater than a selected operating pressure.

In addition, the primary, auxiliary primary and secondary drive gears may be mutually engaged through a shared drive chain.

DESCRIPTION OF THE INVENTION

Figure 1:
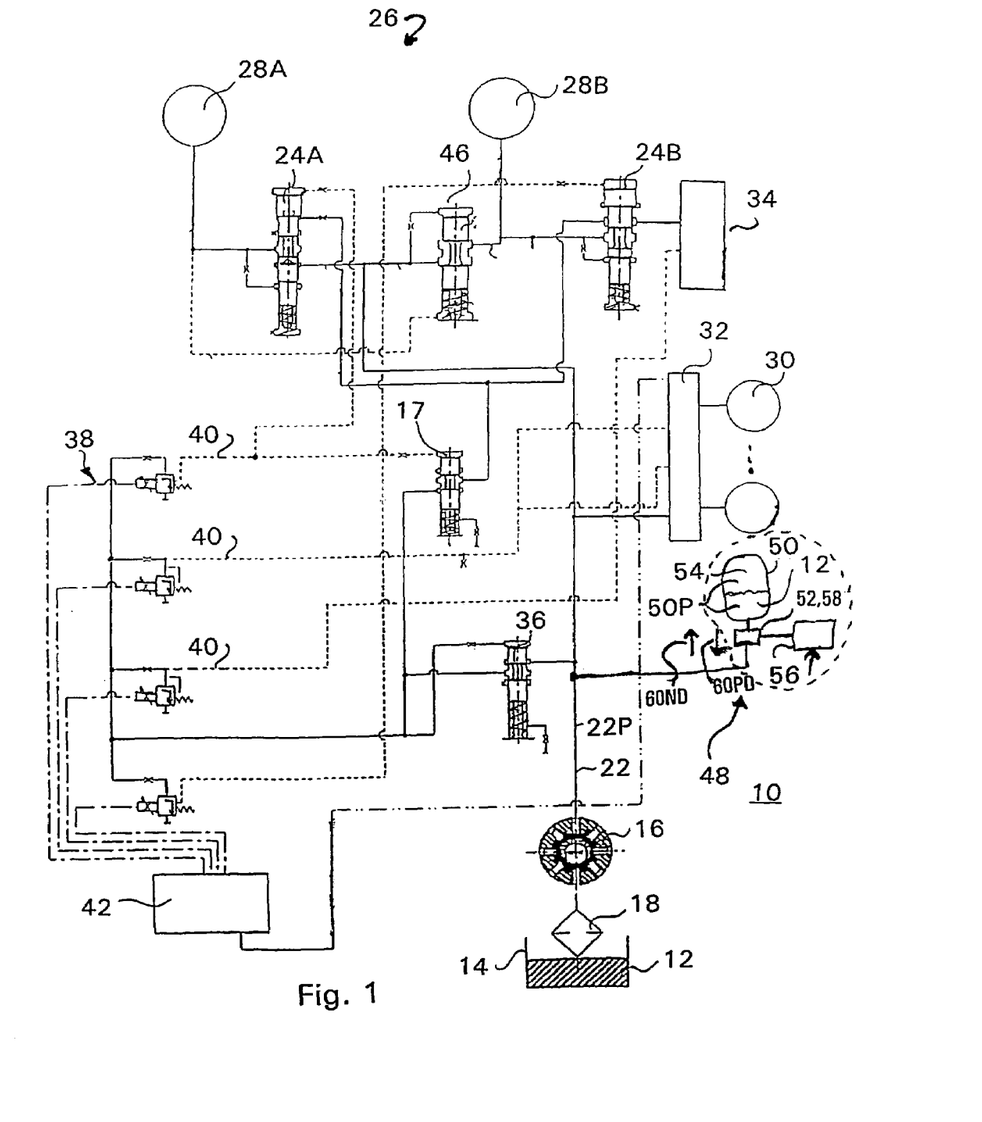
FIGS. 1A and 1B are a schematic diagram of the accumulator system of the present invention of FIG. 1.

Referring to FIG. 1, therein is illustrated a simplified exemplary Hydraulic System 10 for a CVT (Continuously Variable Transmission) of a motor vehicle. As indicated there, and in general, Hydraulic Fluid 12 is drawn from a Hydraulic Fluid Sump 14 by a Hydraulic Fluid Pump 16 and through a Hydraulic Fluid Filter Device 18 wherein Hydraulic Fluid Pump 16 may be, for example, a radial piston pump, and Hydraulic Fluid Filter Device 18 may be a suction filter. Hydraulic Fluid 12 is then distributed to the hydraulic elements of Hydraulic System 10 through a Primary Circuit 22 and at a Primary Pressure 22P.

Primary Circuit 22 provides Hydraulic Fluid 12 to the control and actuation valves of the vehicle transmission, indicated in FIG. 1 as Valve Mechanisms 24A and 24B of Transmission 26 wherein Transmission 26 is assumed, for purposes of the present discussion, to be a CVT having Valve Mechanisms 24A and 24B respectively controlling Primary Pulley Set 28A and a Secondary Pulley Set 28B of Transmission 26. The structure, mechanisms and operation of a Transmission 26 and CVT Valve Mechanisms 24A and 24B in controlling the operation of a CVT Transmission 26 are well known to those of ordinary skill in the relevant arts and, as such, will not be discussed further herein.

As indicated, Primary Circuit 22 may also provided hydraulic pressure to other hydraulically controlled mechanisms, such as a Brake System 30, through associated Valve Mechanisms 30, which may also control still further hydraulic mechanisms or systems, indicated generally as Hydraulic Mechanisms 34. In addition, and in further example, Primary Circuit 22 may be further connected through a Pressure Reduction Valve 36 to a Pressure Regulation Cascade 38, which in turn provides a plurality of pressure regulated Cascade Outputs 40 for controlling other hydraulic valves of the Hydraulic System 10 of the vehicle.

As generally indicated, the operations of CVT Valve Mechanisms 24A and 24B, Valve Mechanisms 30, Hydraulic Mechanisms 34, Pressure Regulation Cascade 38 and other valves of the Hydraulic System 10 may be controlled by an Electronic Transmission Control System 42 or by electronic control mechanisms directed to the control of specific operations and mechanisms, such as control mechanisms for the brake system.

Lastly, those of ordinary skill in the arts recognize the importance of insuring hydraulic pressure to CVT Transmission 26 and CVT Valve Mechanisms 24A and 24B in so far as possible in the event of a failure in Electronic Transmission Control System 42, and the importance of controlling in so far as possible the pressure relationships between CVT Valve Mechanisms 24A and 24B. For these reasons, Hydraulic System 10 typically includes an Emergency Valve 44 connected between the output of Pressure Reduction Valve 36, and thus from Primary Circuit 22, and to hydraulic supply inputs of CVT Valve Mechanisms 24A and 24B, thus essentially bypassing Electronic Transmission Control System 42 if necessary and allowing emergency operation of the CVT Transmission 26. In addition, Hydraulic System 10 typically further includes a Pressure Selector Valve 46 which essentially senses the relative hydraulic pressures to be delivered to CVT Valve Mechanisms 24A and 24B and determines whether Pressure Selector Valve 46 will route the Primary Circuit 22 to CVT Valve Mechanism 24A or to CVT Valve Mechanism 24B, thereby maintaining the desired pressure and pressure offset relationship between CVT Valve Mechanisms 24A and 24B.

Now considering the present invention in further detail, as described herein above the problem addressed by the present invention is that of providing hydraulic pressure and hydraulic fluid flow to a vehicle hydraulic system when the vehicle is stopped or is otherwise idling and at engine start-up while adding the minimum cost and complexity to the system.

In this regard, it is well known and understood that the hydraulic system of a vehicle, and in particular the hydraulic system associated with a transmission, is not in itself a pressure sealed system. The pressurization of the system is instead dependent upon the flow of hydraulic fluid through a hydraulic pump, such as Hydraulic Fluid Pump 16. As described, this mode of operation thereby often results in a hydraulic pressure and rate of hydraulic fluid flow that exceeds actual requirements at higher engine speeds, and an insufficient hydraulic pressure of hydraulic fluid flow when the engine is in the lower speed range or is idling. The latter condition is also often a problem during the transition from the idling state to a moving state, particularly as an increase in hydraulic pressure due to higher pump speeds will lag increases in engine and transmission speeds and the hydraulic system and transmission pressure requirements.

According to the present invention, Hydraulic System 10 includes an Accumulator Reserve System 48 that includes Accumulator Tank 50 connected from Primary Circuit 22 through an Accumulator Control Valve 52 and containing Gas 54 and Hydraulic Fluid 12 in a ratio dependent upon the Accumulator Pressure 50P in Accumulator Tank 50. Accumulator Control Valve 52 controls the direction and flow of Hydraulic Fluid 12 between Accumulator Tank 50 and Primary Circuit 22. Accumulator Control Valve 52 is in turn controlled by an Accumulator Controller 56, which may be a part of Electronic Transmission Control System 42 but which will be considered herein as an independent element for clarity and simplicity in description.

Accumulator Controller 56 either senses the present operating conditions in Hydraulic System 10 and in Transmission 26, and in particular with respect to the current actual and required hydraulic pressures and hydraulic fluid flows in the system, or is provided with control signals from Electronic Transmission Control System 42 indicative of these conditions. Accumulator Controller 56 then generates control signals to Accumulator Control Valve 52 to control the flow of hydraulic pressure and fluid between Primary Circuit 22 and Accumulator Tank 50 according to the current requirements of Hydraulic System 10 and Transmission 26.

Under normal operating conditions, that is, when the vehicle is in motion in the normal speed ranges and at the appropriate gear ratios, Accumulator Controller 56 will control Accumulator Control Valve 52 to allow Hydraulic Fluid 12 to flow from Primary Circuit 22 and into Accumulator Tank 50 so long as the Primary Pressure 22P in Primary Circuit 22 is greater than Accumulator Pressure 50P in Accumulator Tank 50. Accumulator Controller 56 will close off the flow of Hydraulic Fluid 12 through Accumulator Control Valve 52, however, when Primary Pressure 22P is equal to or less than Accumulator Pressure 50P, so that Accumulator Pressure 50P will generally be held at the most recent highest Primary Pressure 22P. Accumulator Tank 50 thereby accumulates and holds a reserve of Hydraulic Fluid 12 at a pressure equal to or higher than the current Primary Pressure 22P when Primary Pressure 22P decreases below Accumulator Pressure 50P, such as during the idling state, and is replenished or increased whenever Primary Pressure 22P increases over the current Accumulator Pressure 50P, which is typically when the engine and transmission are operating in the normal or higher speed ranges.

As discussed herein above, Primary Pressure 22P and the flow of Hydraulic Fluid 12 may drop below the desired operating ranges under certain conditions, such as when the vehicle is stopped and the engine is idling or, in particular, during the transition period from the idling state to a moving state. In this transition period, the increase in hydraulic pressure and fluid flow due to the higher pump speed resulting from the increase in engine speed will generally lag corresponding increases in the necessary transmission pressure and hydraulic fluid flow due to the increased transmission speeds. Primary Pressure 22P and the flow of Hydraulic Fluid 12 may also drop below the desired operating ranges in other conditions, such as during an acceleration or speed surge when operating in the normal speed ranges.

If Accumulator Controller 56 detects or receives signals indicating that Primary Pressure 22P has dropped below the range of pressure levels or hydraulic fluid flow rates designated for the current operating conditions of Hydraulic System 10 or Transmission 26, Accumulator Controller 56 will controllably open Accumulator Control Valve 52 to allow the flow of hydraulic Fluid 12 from Accumulator Tank 50 to Primary Circuit 22 at the Accumulator Pressure 50P, thereby increasing the Primary Pressure 22P and Hydraulic Fluid 12 volume of Primary Circuit 22 to the desired ranges. In this regard, it will be recognized that the time period over which Accumulator Tank 50 can raise the pressure and flow rate in Primary Circuit 22 is dependent such factors as the volume of Accumulator Tank 50, the Primary Pressures 22P achieved in Primary Circuit 22 when Accumulator Tank 50 is replenished from Primary Circuit 22 during the periods in which Primary Pressure 50P exceeds Accumulator Pressure 50P, and the amount by which Primary Pressure 22P drops below the desired pressure ranges. The volume of Accumulator Tank 50 is generally determined, however, according to these limitations and to be sufficient for Accumulator Tank 50 to sustain at least a minimum desired pressure in Primary Circuit 22 over one or more low pressure periods, that is, over one or more transition periods from the idling state to a moving state or speed or acceleration surge periods.

Figure 1A:
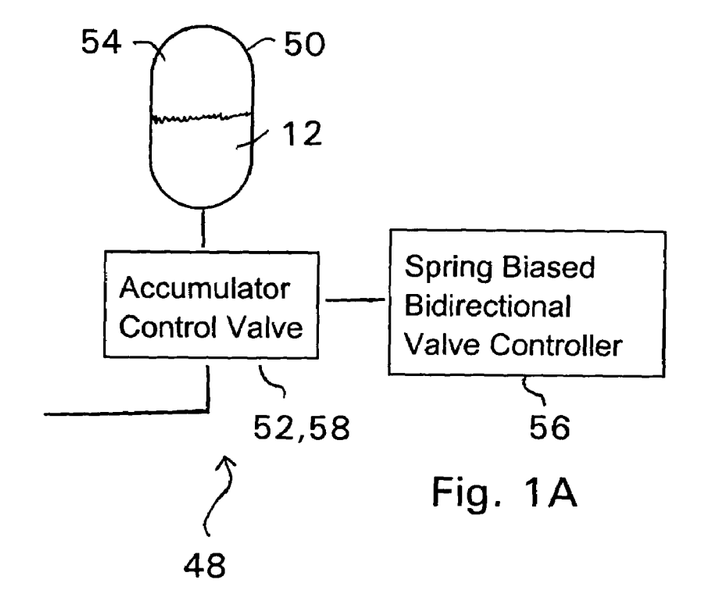
Figure 1B:
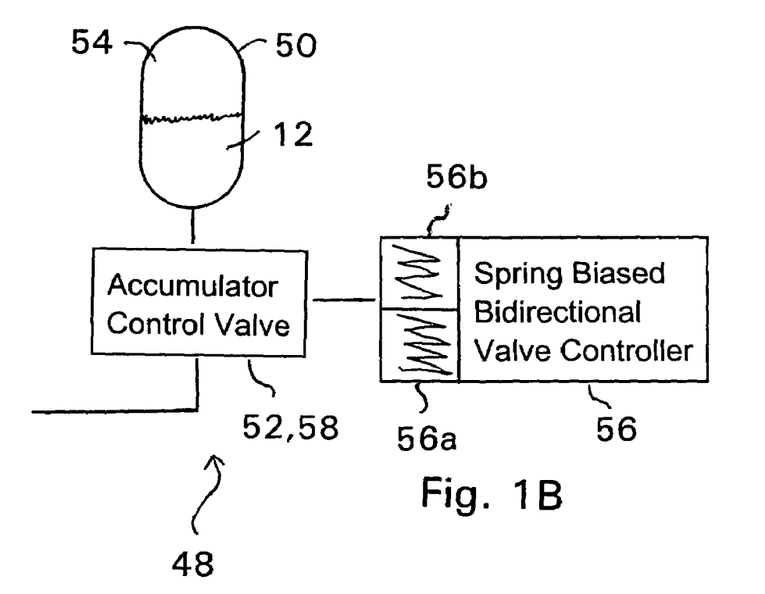

It will also be recognized and understood by those of ordinary skill in the relevant arts that an Accumulator Reserve System 48 of the present invention may be implemented in other forms, depending upon the requirements of the vehicle, Hydraulic System 12 and Transmission 26. For example, Accumulator Controller 56 and Accumulator Control Valve 52 may be implemented as a self-controlling Accumulator Control Valve 58 wherein the flow of Hydraulic Fluid 12 through Accumulator Control Valve 58 in either direction is dependent upon a Differential Pressure 60 across Accumulator Control Valve 58. As seen in FIGS. 1A and 1B, the valve controller can include a spring biased bidirectional valve controller and positive and negative adjustable bias springs 56a and 56b.

That is, when Primary Pressure 22P is greater than Accumulator Pressure 50P by a predetermined amount, which may be designated as Positive Differential Pressure 60PD, Accumulator Control Valve 58 will open to allow Hydraulic Fluid 12 to flow into Accumulator Tank 48 and Accumulator Pressure 48P to rise accordingly. When Primary Pressure 22P is less than Accumulator Pressure 50P by a predetermined amount, which may be designated as Negative Differential Pressure 60ND, Accumulator Control Valve 58 will open to allow Hydraulic Fluid 12 to flow from Accumulator Tank 48 to Primary Circuit 22, thereby increasing Primary Pressure 22P and the volume of Hydraulic Fluid 12 in Primary Circuit 22 accordingly.

In a typical implementation of an Accumulator Control Valve 58, Positive Differential Pressure 60PD will be lower than Negative Differential Pressure 60ND and, in most cases, the absolute magnitude of Positive Differential Pressure 60PD will be relatively small to facilitate the replenishment of Accumulator Tank 48. The value of Negative Differential Pressure 60ND to actuate Accumulator Control Valve 58, however, will be determined by the range and values of acceptable operating pressures for Hydraulic System 10 and Transmission 26.

Further in this regard, Positive Differential Pressure 60PD and Negative Differential Pressure 60ND and the opening/closing operating points of Accumulator Control Valve 58 about these pressures will typically be selected so that Accumulator Control Valve 58 exhibits hysteresis in its operation, thereby preventing "valve chatter" and assisting in maintaining the maximum reserve pressure in Accumulator Tank 48 while preventing the pressure and volume of Hydraulic fluid in Primary Circuit 22 and Transmission 26 from falling below the acceptable limits for as long as possible. The valve mechanism of Accumulator Control Valve 58 may further incorporate a time delay mechanism, or an inertia mechanism, for the same reasons.

Finally, it should be noted that the design of valves such as Accumulator Control Valve 58, that is, pressure actuated valves with spring adjustment of the actuating pressure or pressures is well known and understood by those of ordinary skill in the relevant arts. It should also be noted that an Accumulator Control Valve 58 as described above may be implemented as a single valve structure having, for example, a spring adjusted, pressure actuated passage in each direction through the valve. An Accumulator Tank 50 may also be implemented as two separate valves of a similar nature, one oriented with a passage input connected from Primary Circuit 22 and the passage output connected to Accumulator Tank 50, and the other connected between Primary Circuit 22 and Accumulator Tank 50 in the reverse orientation.

It will be recognized that there will be vehicle Hydraulic systems and circumstances when it may be desirable for a number of reasons to employ a Hydraulic reserve system not relying on an Accumulator Tank 50 system reserve, such as described above. Such circumstances may arise, for example, when it is desirable to have greater Hydraulic system reserve capacity greater than can be provided from an Accumulator Reserve System 48 of reasonable capacity, such as in heavy and powerful vehicle systems such as trucks and construction machinery. Such circumstances may also arise, for example, in systems that operate in the idle state for very extended periods or have extended or frequent power or speed surge periods, systems that require immediate Hydraulic pressure and fluid flow at first startup, and so on.

Systems of the prior art have, for example, employed a primary power source to provide the necessary Hydraulic pressures and fluid flows in the normal and upper operating ranges of the engine and vehicle and a secondary pump and power source to provide Hydraulic pressure and fluid flow in the lower operating ranges of the vehicle and engine, in the idling ranges and at engine start-up. The secondary power source may be any form of motor or engine and may be of the same type as the primary power source, but is often of a different type from the primary power source, such as an electric motor when the primary source is a gas or diesel engine or a gas engine when the primary power source is an electric or Hydraulic motor. While this method is generally operable, it requires not only an additional power source, which is essentially unavoidable as the primary power source is unavailable to generate the required Hydraulic pressure, but also an additional pump, with the resulting increase in cost, complexity and weight.

The present invention, however, provides a means for providing the required Hydraulic pressure when the primary power source is unavailable, such as in the idle state, but without requiring an additional secondary pump with the consequent added cost, complexity and weight.

Figure 2:
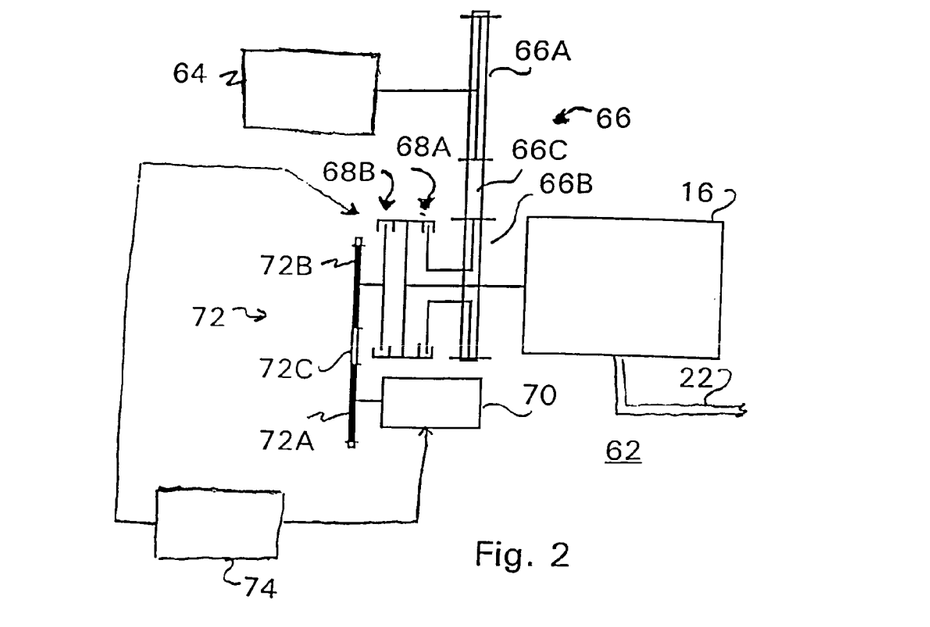
FIGS. 2 and 3 are block diagrams of the hydraulic system and transmission of a vehicle incorporating an auxiliary hydraulic drive system of the present invention.

Referring to FIG. 2, therein is shown a general schematic diagram of a Hydraulic System 62, focusing on the elements pertinent to the present invention. Those of ordinary skill in the relevant arts will recognize that those portions of Hydraulic System 62 illustrated in FIG. 2 include a Hydraulic Fluid Sump 14, a Hydraulic Fluid Pump 16 and a Primary Circuit 22 as shown in FIG. 1 and as discussed above.

As illustrated in FIG. 2, the Hydraulic System 62 includes a Primary Drive 64 connected to and driving a Primary Gear 66A of a Primary Gear Set 66 that may be comprised of meshing Primary and Secondary Gears 66A and 66B or, in a typical embodiment, Primary and Secondary Gears 66A and 66B coupled by a Drive Chain 66C or by an equivalent belt drive. It will be understood that Primary Drive 64 may be of any form, such as a gas or diesel engine, an electric motor or a hybrid combination.

Secondary Gear 66B is coupled to the input of a Primary Drive Clutch 68A, the output of which is connected to the drive input of Hydraulic Fluid Pump 16 when Primary Drive Clutch 68A is engaged. Primary Drive 64 will thereby drive Pump 16 when Primary Drive Clutch 68A is engaged, but may be disconnected from Pump 16 by disengaging Primary Drive Clutch 68A when Primary Drive 64 is not available for any reason, such as when Primary Drive 64 is off or idling or during a start-up transition when Primary Drive 64 is first starting or is first beginning to deliver power.

As shown, Hydraulic System 62 further includes an Auxiliary Drive 70 connected to a Secondary Drive Clutch 68B through the Auxiliary Primary and Secondary Gears 72A and 72B of an Auxiliary Gear Set 72 wherein Auxiliary Gear Set 72 may be comprised of meshing Auxiliary Primary and Auxiliary Secondary Gears 72A and 72B. Auxiliary Primary and Secondary Gears 72A and 72B may also be coupled by an Auxiliary Drive Chain 72C or by an equivalent belt drive. It will be understood that Auxiliary Drive 70 may be of any form, such as a gas or diesel engine, an electric motor or a hybrid combination, but will typically be of a different type than Primary Drive 64 and most commonly will be an electric motor.

Auxiliary Secondary Gear 72B is coupled to the input of a Secondary Drive Clutch 68B, the output of which is connected to the drive input of Hydraulic Fluid Pump 16 when Secondary Drive Clutch 68B is engaged. Auxiliary Drive 70 will thereby drive Pump 16 when Secondary Drive Clutch 68B is engaged, but may be disconnected from Pump 16 by disengaging Secondary Drive Clutch 68B when Primary Drive Clutch 68A is engaged so that Primary Drive 64 is driving Pump 16.

It will also be recognized that in other embodiments, Auxiliary Drive 70 may be integrated with or into Hydraulic Fluid Pump 16 and may be powered to drive Hydraulic Fluid Pump 16 when Primary Drive Clutch 68A is disengaged.

Lastly, Primary Drive Clutch 68A, Secondary Drive Clutch 68B and Auxiliary Drive 70 will typically be controlled either by Electronic Transmission Control System 42 or by an Auxiliary Hydraulic Drive Controller 74 that may be analogous to the Accumulator Controller 56 described above.

According to the present invention, therefore, when Primary Drive 64 is operating to deliver power in normal speed ranges and is thereby capable of delivering sufficient power to Hydraulic Fluid Pump 16 to deliver the required Hydraulic fluid flow rate to Primary Circuit 22 at the required operating pressure, Hydraulic Drive Controller 74 will sense that the Hydraulic pressure at or above a preselected minimum pressure and will operate to engage Primary Drive Clutch 68A so that Primary Drive 64 will drive Hydraulic Fluid Pump 16. At such times, Hydraulic Drive Controller 74 will also disengage Secondary Drive Clutch 68B thereby disengaging Auxiliary Drive 70 from Hydraulic Fluid Pump 16, and Auxiliary Drive 70 will be off or in a stand-by or idling state.

When Primary Drive 64 is not in an operating state to deliver adequate power to Hydraulic Fluid Pump 16, such as when Primary Drive 64 is off or idling or in a transition state from off or idling to beginning to deliver power, and the Hydraulic pressure is below a preselected minimum pressure, Hydraulic Drive Controller 74 will disengage Primary Drive Clutch 68A and will engage Secondary Drive Clutch 68B so that Auxiliary Drive 70 will be delivering the necessary power to Hydraulic Fluid Pump 16 to provide the required Hydraulic pressure and Hydraulic fluid flow to Primary Circuit 22.

It will, therefore, be appreciated and understood that the auxiliary power system of the present invention accomplishes the purpose of providing power to meet the Hydraulic system pressure and fluid flow requirements when Primary Drive 64 is not in an operating state to do so, and does so without the added cost, complexity and weight of an auxiliary pump.

Figure 3:
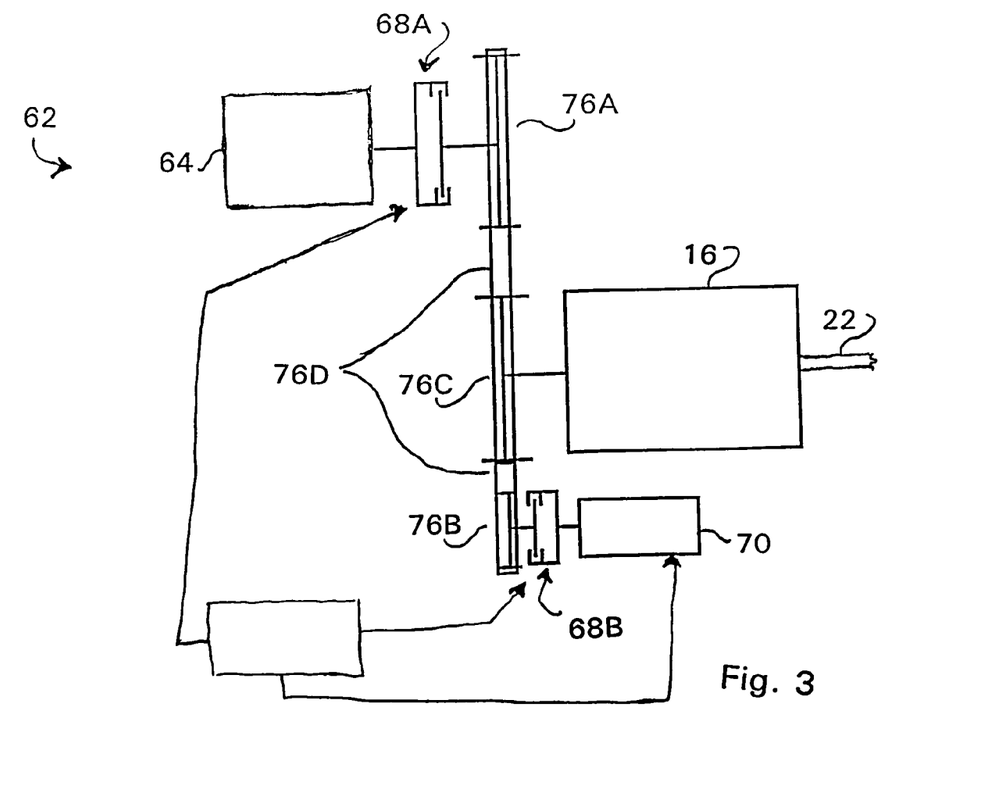
Figure 4:
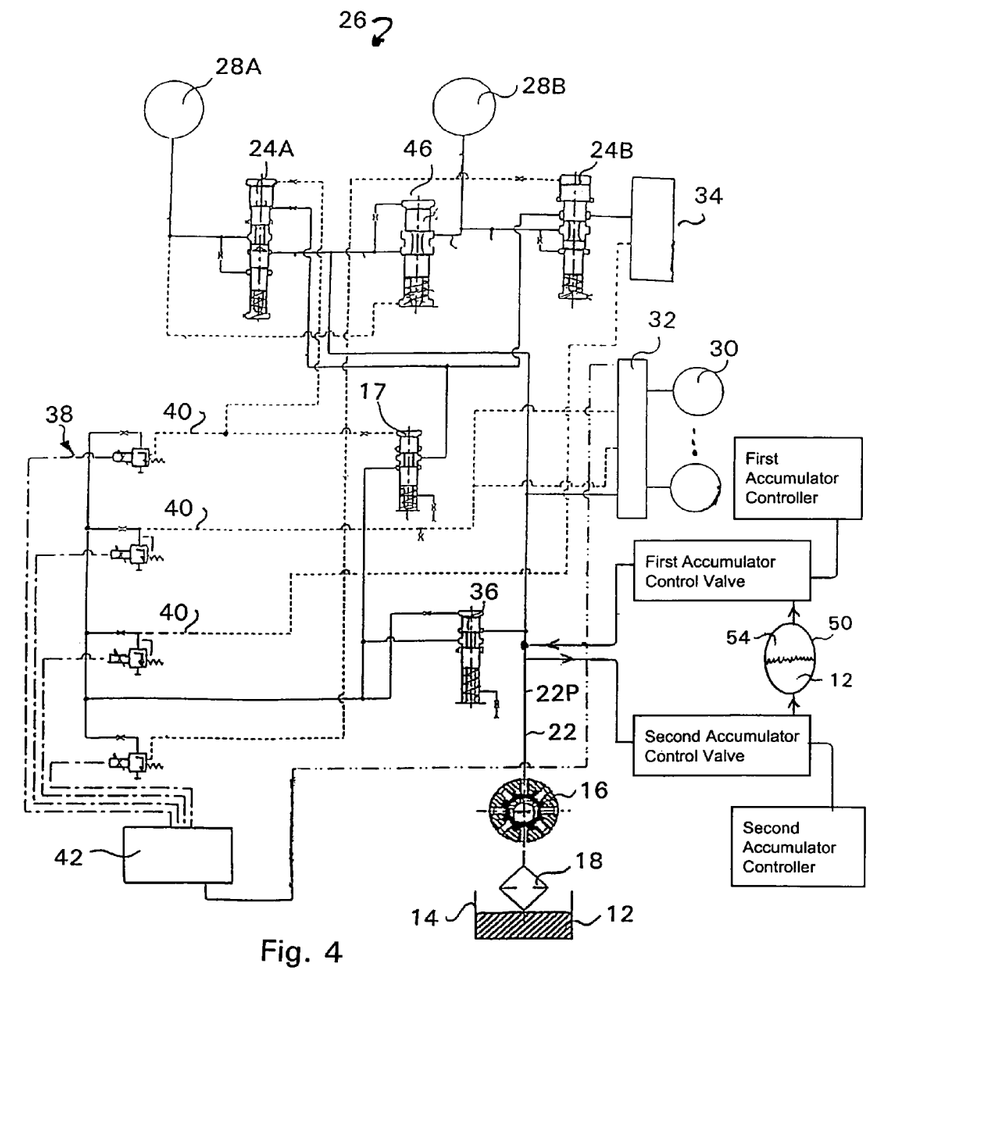
FIG. 4 is a schematic representation of hydraulic system transmission of a vehicle incorporating another embodiment of the accumulator system of the present invention.

FIG. 3 illustrates a second embodiment of the auxiliary power system of the present invention as just described with reference to FIG. 2. In this regard, it will be noted that in the embodiment described with reference to FIG. 2 the Primary Drive Clutch 68A and Secondary Drive Clutch 68A are combined in a single Drive Clutch 68, which may be of a variety of types similar to that shown or which may be, for example, an overrun clutch.

In the embodiment illustrated in FIG. 3, the Drive Clutch 68 is comprised of two separate clutches; that is, a Primary Drive Clutch 68A and Secondary Drive Clutch 68B, which are physically separate clutches, thereby allowing greater flexibility in the mechanical layout of the system.

It should also be noted that in this embodiment Primary Drive Clutch 68A and Secondary Drive Clutch 68B may be arranged so that a Primary Gear 76A driven by Primary Drive 64 and an Auxiliary Primary Gear 76B driven by Auxiliary Drive 70 will jointly drive a single Secondary Gear 76C that in turn drives Hydraulic Fluid Pump 16. As indicated, the joint drive of the single Secondary Gear 76C may be by means of a single Drive Chain 76D, or equivalent drive belt, shared between Primary Gear 76A and Auxiliary Primary Gear 76B.

It must also be noted that in this embodiment Primary Drive Clutch 68A is connected between the Primary Drive 64 and Primary Gear 76A and Secondary Drive Clutch 68B is connected between Auxiliary Drive 70 and Auxiliary Primary Gear 76B. Under this arrangement, therefore one of Primary Drive Clutch 68A and Secondary Drive Clutch 68B will be engaged and the other will be disengaged. As a consequence, the engaged one of Primary Gear 76A and Auxiliary Primary Gear 76B will drive Secondary Gear 76C and thus Hydraulic Fluid Pump 16, while the disengaged one of Primary Gear 76A and Auxiliary Primary Gear 76B will "freewheel".

It will, therefore, be apparent that these alternate embodiments of the present invention will accomplish the same purpose as the embodiment illustrated in FIG. 2 of providing power to meet the hydraulic system pressure and fluid flow requirements when Primary Drive 64 is not in an operating state to do so, and to do so without the added cost, complexity and weight of an auxiliary pump.

It must also be noted with respect to the implementations of the present invention as illustrated in FIGS. 2 and 3, that when the Primary Drive 64 is engaged in normal operating ranges, the Auxiliary Drive 70 can be used to recharge the auxiliary drive power source (batteries) when the auxiliary clutch, Secondary Drive Clutch 68B, is also engaged. In addition, when both clutches are closed the auxiliary drive can be used as a starting device for the primary drive.

It must also be noted that in the implementation illustrated in FIG. 2 the auxiliary drive can be used as a power assist device (for acceleration) when both clutch are engaged. In the implementation illustrated in FIG. 3, the auxiliary drive can also be used to drive the vehicle, operating as a power assist to the primary drive or as a stand alone power source. If the auxiliary drive is employed as a power assist device (for acceleration), both clutches are engaged, and, if the auxiliary drive is employed as a stand alone power source, the primary drive clutch is open and the auxiliary clutch is closed Since certain changes may be made in the above described method and system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A hydraulic pressure reserve system for a vehicle hydraulic system including a primary hydraulic circuit including a hydraulic pump and a hydraulic sump and providing hydraulic pressure to at least a hydraulically actuated transmission, the hydraulic pressure reserve system comprising:

an accumulator tank connected from the primary hydraulic circuit for storing a reserve of hydraulic fluid at an accumulator pressure, and an accumulator control valve for controlling a flow of hydraulic fluid between the primary hydraulic circuit and the accumulator tank, and an accumulator controller responsive to a primary hydraulic circuit pressure and to the accumulator pressure for controlling the accumulator control valve, wherein the accumulator controller actuates the accumulator control valve to allow a flow of the hydraulic fluid from the primary hydraulic circuit and into the accumulator tank when the primary hydraulic circuit pressure is greater than the accumulator pressure, and the accumulator controller actuates the accumulator control valve to allow a flow of the hydraulic fluid from the accumulator tank to the primary hydraulic circuit when the primary hydraulic circuit pressure is lower than a desired minimum primary hydraulic circuit pressure, thereby raising the primary hydraulic circuit pressure towards the desired primary hydraulic circuit pressure.

2. The hydraulic pressure reserve system for a vehicle hydraulic system of claim 1 wherein:

the accumulator control valve includes a bidirectional valve allowing a bidirectional flow of hydraulic fluid between the accumulator tank and the primary circuit, and the accumulator controller includes a spring biased bidirectional valve controller actuating the bidirectional valve dependent upon a differential pressure across the valve controller between the primary circuit and the accumulator tank, such that when there is a positive differential pressure across the bidirectional valve controller wherein the primary circuit hydraulic pressure is greater than the accumulator pressure by greater than a selected positive actuation pressure, the bidirectional valve is opened by the bidirectional valve controller to allow the hydraulic fluid to flow into the accumulator tank and the accumulator pressure to rise accordingly, and when there is a negative differential pressure across the bidirectional valve controller wherein the primary circuit pressure is less than the accumulator pressure by greater than a selected negative actuation pressure, the bidirectional valve is opened by the bidirectional valve controller to allow the hydraulic fluid to flow from the accumulator tank to the primary circuit, thereby raising the primary hydraulic circuit pressure towards a desired primary hydraulic circuit pressure.

3. The hydraulic pressure reserve system for a vehicle hydraulic system of claim 2 wherein:

the magnitude of the positive actuation pressure is less than the magnitude of the negative actuation pressure.

4. The hydraulic pressure reserve system for a vehicle hydraulic system of claim 2 wherein:

the bidirectional valve controller includes positive and negative adjustable bias springs acting upon the bidirectional valve.

5. The hydraulic pressure reserve system for a vehicle hydraulic system of claim 4 wherein:

the positive and negative actuation pressures are selected to provide hysteresis in opening and closing of the bidirectional valve.

6. The hydraulic pressure reserve system for a vehicle hydraulic system of claim 1 wherein:

a first accumulator control valve and a corresponding first accumulator controller connected from the primary circuit and to the accumulator tank controlling the flow of hydraulic fluid from the primary hydraulic circuit and to accumulator tank, and a second accumulator control valve and a corresponding second accumulator controller connected from the primary circuit and to the accumulator controller for in parallel with the first accumulator control valve and the first accumulator controller for controlling the flow of hydraulic fluid from the accumulator tank and to the primary hydraulic circuit.

* * * * *